(12) United States Patent
Grosse-Kunstleve

(10) Patent No.: US 11,250,584 B2
(45) Date of Patent: Feb. 15, 2022

(54) VISION-ENHANCED POSE ESTIMATION

(71) Applicant: Google LLC, Mountain View, CA (US)

(72) Inventor: Ralf Wilhelm Grosse-Kunstleve, Cupertino, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/852,881

(22) Filed: Apr. 20, 2020

(65) Prior Publication Data

US 2020/0320732 A1 Oct. 8, 2020

Related U.S. Application Data

(63) Continuation of application No. 16/010,880, filed on Jun. 18, 2018, now Pat. No. 10,628,957.

(51) Int. Cl.
*G06T 7/70* (2017.01)
*H04W 4/02* (2018.01)
*H04N 5/225* (2006.01)

(52) U.S. Cl.
CPC ............... *G06T 7/70* (2017.01); *H04W 4/02* (2013.01); *G06T 2207/30244* (2013.01); *H04N 5/2258* (2013.01)

(58) Field of Classification Search
CPC .. G06T 7/70; G06T 2207/30244; H04W 4/02; H04N 5/2258
See application file for complete search history.

(56) References Cited

U.S. PATENT DOCUMENTS

| | | |
|---|---|---|
| 9,857,869 B1 | 1/2018 | Doucette |
| 2015/0170421 A1 | 6/2015 | Mandella et al. |
| 2015/0310310 A1 | 10/2015 | Hesch |
| 2017/0102772 A1 | 4/2017 | Hesch et al. |
| 2017/0118458 A1 | 4/2017 | Gronholm |
| 2018/0342045 A1 | 11/2018 | Lutz |
| 2020/0265231 A1* | 8/2020 | Li ............................ G06T 7/74 |

OTHER PUBLICATIONS

'beecare.bayer.com' [online] "Through Insect Eyes," Available on or before Mar. 20, 2017 via the Wayback Internet Archive [retrieved on Jun. 13, 2018] Retrieved from Internet: URL<https://beecare.bayer.com/media-center/beenow/detail/vision-science-how-bees-perceive-the-world> 4 pages.

(Continued)

*Primary Examiner* — Mazda Sabouri
(74) *Attorney, Agent, or Firm* — Fish & Richardson P.C.

(57) ABSTRACT

This specification discloses computer-based systems, methods, devices, and other techniques for estimating the pose of a device, including estimating the pose based on images captured by a set of image sensors disposed around the device's periphery. Some implementations include a system that obtains visual data representing at least one image captured by one or more image sensors of a mobile device. The at least one image show an environment of the mobile device, and the one or more image sensors are located at respective corners of the mobile device, or at other locations around its periphery. The system processes the visual data to determine a pose of the mobile device. Further, the system can determine a location of the mobile device in the environment based on the pose, and can present an indication of the location of the mobile device in the environment.

23 Claims, 6 Drawing Sheets

(56) References Cited

OTHER PUBLICATIONS

'en.wikipedia.org' [online] "List of Animals by Number of Neurons," Last updated Jun. 12, 2018, [retrieved on Jun. 13, 2018] Retrieved from Internet: URL<https://en.wikipedia.org/wiki/List_of_animals_by_number_of_neurons> 18 pages.

'en.wikipeida.org [online] "Tango (Platform)," Last updated Jun. 18, 2018, [retrieved on Jun. 13, 2018] Retrieved from Internet: URL< https://en.wikipedia.org/wiki/Tango_(platform)> 7 pages.

'www.nasa.gov' [online] "Technology Readiness Level," Oct. 28, 2012, [retrieved on Jun. 13, 2018] Retrieved from Internet: URL<https://www.nasa.gov/directorates/heo/scan/engineering/technology/txt_accordion1.html > 3 pages.

'www.sciencedaily.com' "Artificial bee eye gives insight into insects visual world," Aug. 6, 2010, [retrieved on Jun. 13, 2018] Retrieved from Internet: URL<https://www.sciencedaily.com/releases/2010/08/100805203343.htm> 5 pages.

'www.washingtonpost.com' [online] "Researchers who made praying mantists wear glassed discover a new type of vision," Ben Guarino, Feb. 8, 2018, [retrieved on Jun. 13, 2018] Retrieved from Internet: URL<https://www.washingtonpost.com/news/speaking-of-science/wp/2018/02/08/researchers-who-made-praying-mantises-wear-glasses-see-a-new-type-of-vision/?noredirect=on&utm_term=.792684067117> 7 pages.

Miyano et al. "Camera Pose Estimation of a Smartphone at a Field without Interest Points," Asian Conference on Computer Vision, Nov. 5, 2012, 11 pages.

* cited by examiner

| Time | Object Distances | | | | IMU Detected Movement | | Position Estimate | |
|---|---|---|---|---|---|---|---|---|
| | Oven | Plant | Desk | Window | X | Y | X | Y |
| A | 2.3 | 3.6 | N/A | N/A | 0 | 0 | 0 | 0 |
| B | 0.8 | 2.7 | 1.9 | 4.2 | -0.7 | -1.4 | -0.75 | -1.95 |
| C | 2.5 | 1.2 | 1.3 | 3.2 | -1.7 | 1 | -9.5 | -0.85 |
| D | 4.1 | 2.9 | 1.4 | 1.1 | 0.4 | 2.1 | -2.2 | 1.25 |

VISION-ENHANCED POSE ESTIMATION

CROSS-REFERENCE TO RELATED APPLICATIONS

This application is a continuation of and claims priority to U.S. application Ser. No. 16/010,880, filed on Jun. 18, 2018, the entire contents of which are hereby incorporated by reference.

BACKGROUND

Mobile computing devices commonly include an array of sensors and communication interfaces that provide information useful for determining a location of the device. Location-based sensors include global positioning system (GPS) sensors and inertial measurements units (IMUs). GPS is capable of providing relatively high-resolution measurements describing the geo-location of a device, but GPS depends on reception of satellite signals and therefore tends to provide more precise location information outdoors, and less precise or no information indoors where there is greater noise in the GPS signal. IMUs measure the motion of a device based on accelerations and forces imparted on the device, but can accumulate error when used to track motions of the device for location purposes over a prolonged period of time.

SUMMARY

This specification discloses computer-based systems, methods, devices, and other techniques for estimating the pose of a device, including estimating the pose based on images captured by a set of image sensors disposed around the device's periphery. As used herein, the term "pose" generally refers to the position of a device in an environment (e.g., x, y, and z coordinates of the device), and can additionally include information about the orientation of the device (e.g., rotation of the device about the x, y, and z axes). The pose of the device can also be mapped to a "location," which, as used herein, specifies the position of the device with respect to real-world coordinates (e.g., latitude/longitude geolocation coordinates), or otherwise specifies the position of the device in relation to a real-world reference such as a reference location in a map of the environment.

Some implementations include a system that obtains visual data representing at least one image captured by one or more image sensors of a mobile device. The at least one image show an environment of the mobile device, and the one or more image sensors are located at or near respective corners of the mobile device, or at other locations around its periphery. The system processes the visual data to determine a pose of the mobile device. Further, the system can determine a location of the mobile device in the environment based on the pose, and can present an indication of the location of the mobile device in the environment.

Some implementations include a mobile computing device that includes multiple image sensors disposed around a periphery of the device. The mobile device can include one or more processors and one or more computer-readable media having instructions stored thereon that, when executed by the one or more processors, cause the mobile device to perform operations for a computer-implemented method. The method can include obtaining visual data representing images captured by the plurality of image sensors that show an environment of the mobile device, processing the visual data to determine a pose of the mobile device, determining a location of the mobile device in the environment based on the pose of the mobile device, and presenting an indication of the location of the mobile device in the environment.

Additional aspects of the implementations described herein can include one or more computer-readable media having instructions stored thereon that, when executed by one or more processors, cause performance of any of the operations, methods, and/or processes described herein. A mobile device may include the computer-readable media and the one or more processors.

Some implementations of the technology described herein can, in certain instances, realize one or more of the following advantages. First, by locating a set of image sensors around the periphery of a mobile device, the sensors may provide a wide field of view that covers a substantial portion of the environment around the device (e.g., up to 360-degree vision in all directions around the device). Second, by locating respective image sensors at the corners of a mobile device, each sensor may provide a wide field of view that covers both a lateral portion of the environment and an upper or lower portion of the environment around the device. Additionally, because users tend to grasp their devices along the sides (e.g., the lateral edges of the device), all or some of the corners tend to be exposed. The corner-located image sensors reduce occurrences of occlusion of the sensors' fields of view, and allows the device to perform pose estimation during the normal course of a user's interaction with the device. Fourth, by providing image sensors around the periphery of the device, the device may acquire images that allow it to determine estimates of the pose and location of the device based on analysis of features in the images. Vision-enhanced pose and location estimation can, for example, be used to rectify errors in estimations derived from accelerometer, gyroscope, and/or magnetometer signals. Fifth, by processing visual data, the device may determine its pose and location with high accuracy even when the device has no ability or degraded ability to receive signals from external sources that would indicate its location, such as global positioning system (GPS) or other wireless signals. Thus, the device may process visual data based on images captured by image sensors located around a periphery of the device to estimate its pose and location where GPS is not available, such as in an indoor environment. Sixth, the imaging system for capturing images of the environment and generating visual data can facilitate pose and estimation location with relatively low power, thereby having only a small impact on the battery life of a mobile device. The imaging system consumes relatively low power because an active receiver is unnecessary to detect incoming wireless signals (e.g., GPS signals), the images captured may be relatively low-resolution, and the frequency at which images of the environment are automatically captured may be adjusted according to power management policies (e.g., the frequency can be reduced when the battery power is lower). Seventh, the imaging system may generate visual data representing the environment of the mobile device while preserving privacy interests of persons in the environment by capturing low-resolution images, degrading the images, and/or abstracting the images before they are made available to processes and components outside of the imaging system.

The details of one or more embodiments are set forth in the accompanying drawings and the description below. Other features and advantages will be apparent from the description and drawings, and from the claims.

DETAILED DESCRIPTION

In general, this specification discloses computer-based systems, methods, devices, and other techniques for estimating the pose of a device, including estimating the pose based on images captured by a set of image sensors disposed around the device's periphery.

Figure 1:
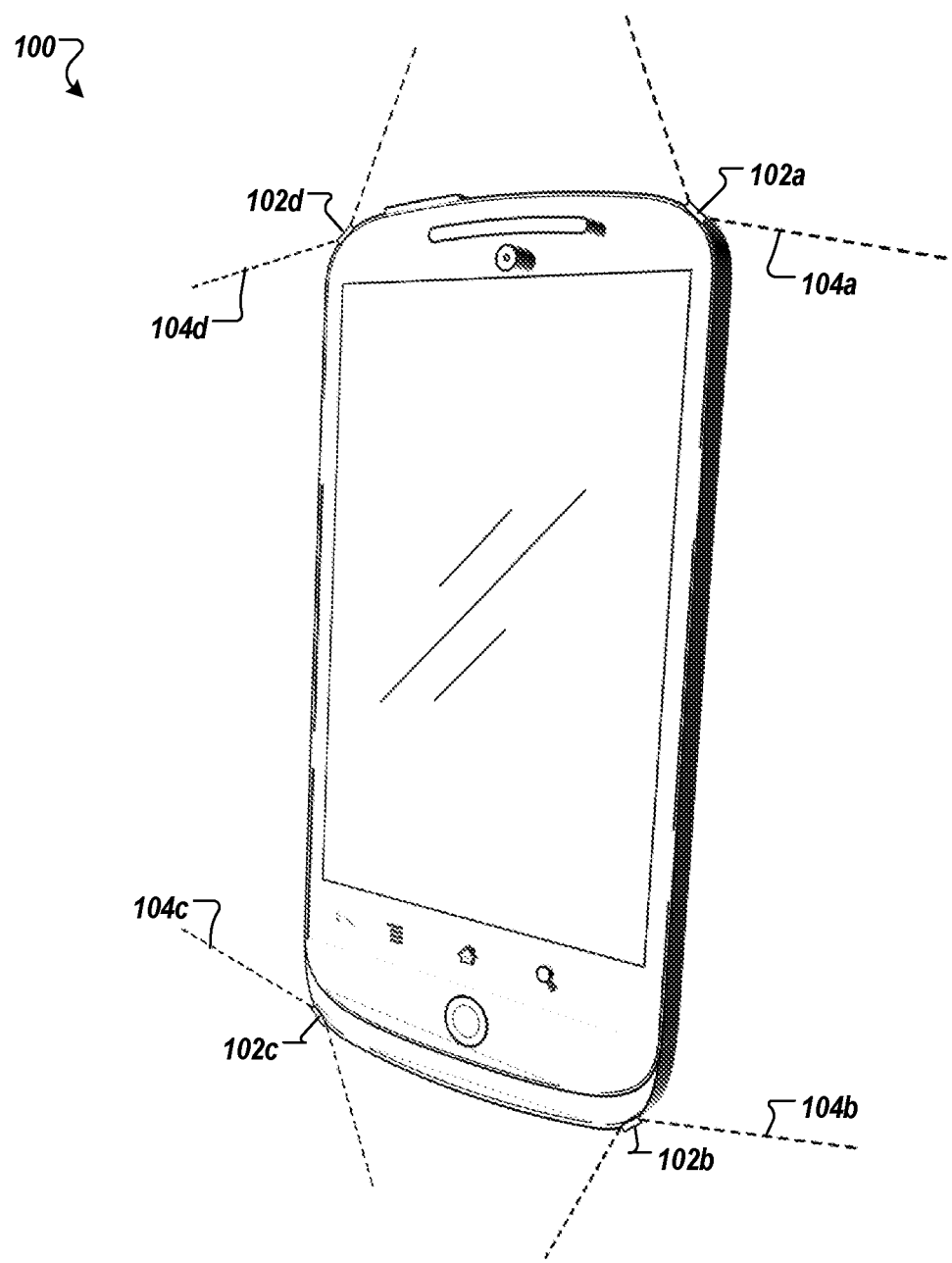
FIG. 1 depicts an example mobile computing device having image sensors disposed around its periphery, where the image sensors are configured for coordinated operation to obtain visual data that can be used to estimate a pose of the device.

Referring to FIG. 1, a mobile device 100 is depicted having a set of image sensors 102a-d disposed around a peripheral edge of the device 100. The image sensors 102a-d are configured to capture images of the environment of the device 100, from which a pose or location of the device 100 can be determined such as by analyzing the images to determine distances of the device 100 from objects and other features shown therein. Additional detail on the image-processing techniques that can be applied for pose and location estimation are described further below with respect to FIG. 3.

In the example of FIG. 1, the mobile device 100 is a smartphone having a front surface with a touchscreen display, a rear surface (not shown), and a peripheral edge having four sides and four corners. However, other types of mobile devices may similarly be equipped with an imaging system adapted for pose estimation and having image sensors disposed along the periphery of the device. For example, the mobile device may be a tablet computer, a wrist-wearable device (e.g., a smartwatch or fitness tracker), a personal digital assistant (PDA) or a tablet computing device.

In the smartphone example shown in FIG. 1, the mobile device includes four image sensors 102a-d, each disposed at a different corner of the device 100. The image sensors 102a-d can be part of a secondary imaging system of the device 100, distinct from other imaging system(s) on the device that are adapted for capturing high-resolution images and photographs. For instance, the device 100 may include a front and rear-facing camera near the horizontal centers of the front and rear surfaces of the device 100, respectively. These cameras may be part of a primary imaging system that allow users of the mobile device 100 to capture images of scenes that they have framed and wish to store or share with others. The image sensors 102a-d of the secondary imaging system, in contrast, may capture relatively low resolution images that are suitable to detect features in the environment for purposes of pose and location estimation, but that would generally be regarded by consumers as inadequate for photography or videography purposes. Although the image sensors 102a-d are shown to protrude slightly from the peripheral edge of the phone, in other implementations, the sensors may lie flush with the edge or may be recessed from the edge if narrower fields of view are permissible for a particular application. Moreover, in some implementations, the device 100 may include additional image sensors 102 along the sides of the device 100, each corner may have multiple image sensors, or fewer than all the corners may have an associated image sensor 102. In some implementations, it is preferable for each corner of the device 100 to have a respective image sensor 102, without any image sensors 102 along the lengths of the sides, so as to realize wide fields of view without interfering with the user's ability to grasp the sides of the device.

As shown, each image sensor 102a-d has a respective field of view 104a-d. The image sensors 102a-d can be arranged to collectively provide spherical vision around substantially an entirety of the device 100. For example, each image sensor 102a-d can have a respective field of view 104a-d that extends around a quadrant of the environment of the device corresponding to the corner where the sensor is disposed. The fields of view 104a-d may partially overlap within a relatively short distance from the device 100, or may be focused so as to avoid intersection. In some implementations, each image sensor 102a-d has a lens that is designed to extend the field of view of the sensor, such as a dome-shaped or "fish-eye" lens.

Figure 2:
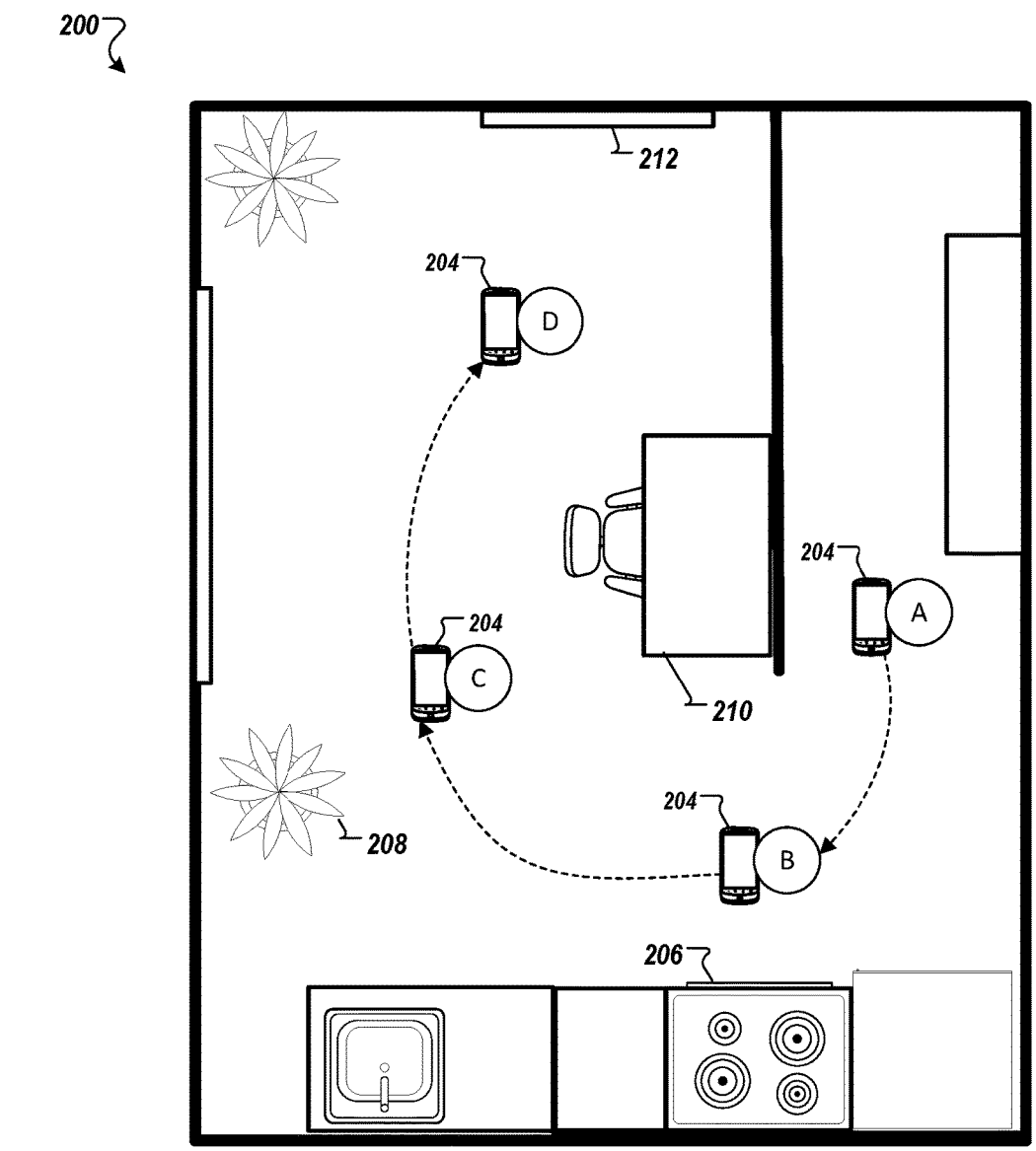
FIG. 2 illustrates a map of an example environment where a mobile computing device captures visual data and tracks its pose as it moves about the environment.

Turning to FIG. 2, a map 200 of an example environment is depicted in which a mobile computing device 204 captures visual data and tracks its pose as it moves about the environment. The mobile device 204 may be a smartphone or other portable device having an imaging system for generating visual data representing the environment of the device, such as the mobile device 102 of FIG. 1. The mobile device 204 may include a set of image sensors located around the periphery, e.g., at or near the corners of the device 204.

In some implementations, the mobile device 204 is configured to constantly track its pose and/or location in the environment. At periodic intervals, the device 204 may use its low-resolution imaging system to capture images of the environment at regular intervals, and to process the images to identify its pose based on its spatial relationship (e.g., direction and/or orientation) with respect to objects or other features of the environment shown in the images. Because the device 204 acquires its own images, in some implementations the device determines its pose or location without the need for receiving GPS or other wireless signals. As such, the vision-based pose and location estimation techniques described herein may beneficially be employed in indoor environments (e.g., in residences, offices, shopping malls) where a GPS signal may be unavailable or degraded to a significant extent. By way of example, the environment depicted in the map 200 is a portion of an apartment or other residence.

In some implementations, the mobile device 204 is configured to estimate its pose or location based on a combination of visual data from image sensors on the device 204 and auxiliary data, such as data from an inertial measurement unit (IMU) in the device 204. Table 202 shows data collected by the device 204 as it moves about the environment to various locations at times A, B, C, and D. Using image-processing algorithms, the device 204 identifies certain reference objects shown in the images as it moves about the environment, and tracks how the distance from the objects within its view change over time.

For example, table 202 shows distances that the mobile device 204 determined based on analysis of the visual data from an oven 206, a plant 208, a desk 210, and a window 212 at times A, B, C, and D. Additionally based on forces and accelerations of the device 204 indicated by IMU signals, table 202 shows estimated changes in the device's position in the environment at the four times A, B, C, and D. The device 204 can then estimate its pose (e.g., position) using the object distances and detected motion from the IMU. For instance, the position estimates shown in the far right two columns of table 202 reflect how the device moves down and around the dividing wall in the apartment at times A, B, C, and D. The device 204 arbitrarily sets its initial position at time A at x, y coordinates (0, 0), and then expresses its position as a displacement relative to these coordinates at the subsequent times B, C, and D. In some implementations, the pose (e.g., position) can be mapped to a location in a real-world coordinate system, such as geo-location coordinates or a location with respect to a pre-defined object or other reference in the environment.

Figure 3:
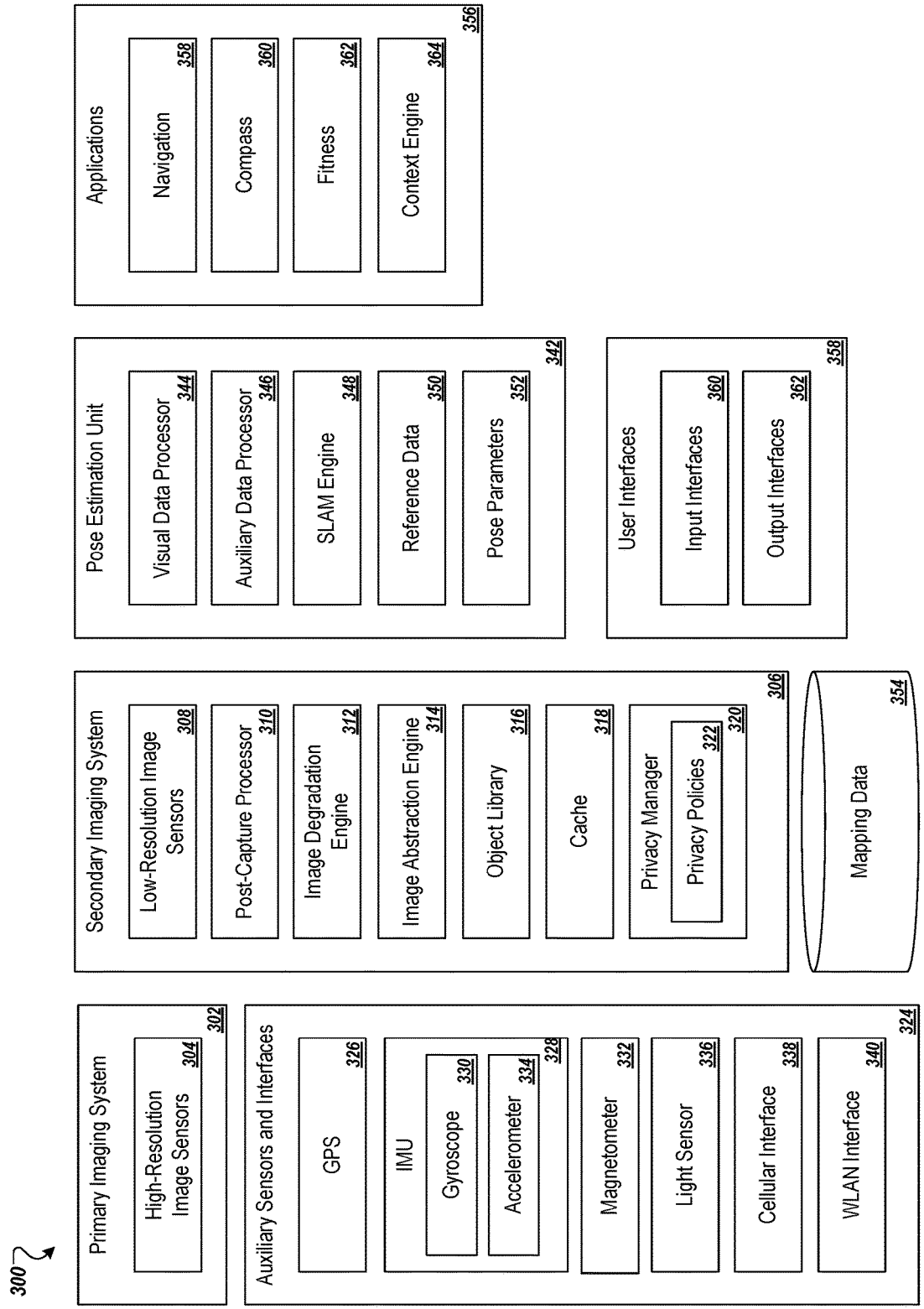
FIG. 3 is a block diagram of an example computing system for estimating a pose and location of a mobile device using visual data captured by image sensors on the device.

FIG. 3 depicts a block diagram of an example computing system 300 configured to estimate the pose and location of a mobile computing device. In some implementations, the computing system 300 is embodied entirely within the mobile computing device. In other implementations, certain components of the system 300 are embodied within the mobile computing device, while other components are embodied external to the mobile computing device. For example, the mobile device itself may include the primary imaging system 304, secondary imaging system 306, and auxiliary sensors and interfaces 324, and other components, while the pose estimation unit 342 may be embodied in one or more other computers remotely located from the mobile computing device (e.g., as a cloud-based service accessible over the Internet). Thus, the computing system 300 can include one or more computers in one or more locations, or may consist of just a single mobile computing device. Examples of mobile computing devices include smart-phones, tablet computers, notebook computers, personal digital assistants (PDAs), wearable devices such as wrist-worn devices (e.g., smartwatches), wands, and handheld remote control devices. For instance, the mobile device 100 described with respect to FIG. 1 may be applied as the mobile device of system 300. In some implementations, the computing system 300 is configured to perform the computer-implemented methods described herein, including the example process 500 described with respect to FIG. 5.

The computing system 300 can include a primary imaging system 302 and a secondary imaging system 306, or the system 300 may simply have the secondary imaging system 306 without the primary system 302. The primary imaging system 302 includes high-resolution image sensors 304, whereas the secondary imaging system 306 includes low-resolution image sensors 308. For example, the resolution of the sensors 308 in secondary imaging system 306 may be only a fraction of the resolution of the sensors 304 in the primary imaging system 302 (e.g., less than or equal to 1/n of the resolution of the primary imaging sensors 304 for n equal to 2, 3, 5, 10, 20, 35, 50, 75, 100, 150, or 200). The differences in resolution between the primary and secondary imaging systems 302 and 306 can be explained by the fundamentally different capabilities and purposes of the systems 302 and 306. The primary imaging system 302 is configured to capture relatively high-quality photographs and videos.

In contrast, the secondary imaging system 306 is a low-resolution, privacy-enhanced imaging system. The secondary system 306 may only be capable of capturing relatively low-quality images of the environment of the mobile device. The resolution may be sufficient to permit tracking of features (e.g., objects) in the vicinity of the mobile device, but does not clearly depict details of the environment. Thus, images captured with the secondary imaging system 306 may have relatively poor quality that would be insufficient for photography. In some implementations, as described further below, the secondary imaging system 306 may blur, distort, or otherwise degrade images captured with image sensors 308, and/or may generate abstractions of images captured with image sensors 308 so as to prevent recognition of specific objects in the environment. The abstracted representation of an image can describe generic representations of features (e.g., objects) shown in the images without revealing the underlying features themselves.

The low-resolution image sensors 308 are disposed in the mobile device at locations that allow the sensors 308 to view wide portions of the surrounding environment. In some implementations, two, three, four, or more image sensors 308 are disposed around the mobile device in an arrangement that maximizes their collective field of view. For example, a respective image sensor 308 can be located at each corner of the mobile device, and each sensor 308 can have a relatively wide field of view that covers at least the corresponding quadrant of the environment around the corner where the sensor 308 is disposed. In this way, the set of low-resolution image sensors 308 can collectively provide coverage of the environment surrounding the mobile device in substantially all directions (e.g., greater than 95-percent coverage and up to 100-percent or 360-degree spherical coverage). The sensors 308 can be disposed at a central portion of each corner between the front and rear surfaces of the mobile device, such as along a bezel that joins the front and rear surfaces or at an interface where the front and rear surfaces abut. An optical axis of each image sensor can be oriented in a direction that is substantially normal to a second axis of the mobile device, the second axis running normal to at least one of a major portion of a front surface of the mobile device or a major portion of a rear surface of the mobile device.

In some implementations, the mobile device may include image sensors 308 on only a subset of the corners of the device, such as the top two corners of a rectangular device, the bottom two corners of the device, the two corners on either the left or right sides of the device, or diagonally opposite corners of the device. Reducing the number of sensors may save material and manufacturing costs, while still providing substantial coverage of the environment of the device. For example, just two image sensors 308 disposed at respective corners of the mobile device may provide coverage of greater than 75-percent of all possible views surrounding the device. Regardless of the particular number of image sensors 308 provided, each image sensor 308 may itself provide a relatively wide field of view. For example, each image sensor 308 may include a fish-eye or other wide-area lens that protrudes slightly from a surface of the housing of the mobile device and that allows the image sensor 308 to capture a wide portion of the environment.

Generally, the image sensors 308 are configured and arranged to capture large swaths of the environment surrounding the device without regard to how the device is oriented or being held. For example, by locating the image sensors 308 at the corners of the mobile device, they are less likely to be inadvertently covered by a user's hand during the normal course of interaction with the device. Users often hold their smartphones by grasping the sides, leaving at least two or all corners of the device exposed. With the placement of sensors as described herein, the image sensors 308 at the exposed corners can then capture images of the environment even while the user grasps the sides of the device and/or grasps some corners of the device. Where the mobile device is equipped with a respective image sensor 308 at each corner, the device can capture images with any of the exposed image sensors 308 while suppressing the capture of images with any image sensors 308 that are covered. The device may automatically detect which sensors are exposed or covered at any given time (e.g., based on an amount of ambient light detected by each sensor 308), and may dynamically configure itself to capture images of the environment with only the exposed sensors 308. In some implementations, the image sensors 308 of the secondary imaging system 306 are located only at the corners of the mobile device, without any additional sensors 308 being located along the major portions of the top, bottom, or lateral sides of the device, and without any additional sensors on the major front or rear surfaces of the device.

The secondary imaging system 306 further includes a post-capture processor 310. The post-capture processor 310 is configured to process signals from the low-resolution image sensors 308 (e.g., raw images) and prepare them for further processing by other components of the secondary imaging system 306 or by the pose estimation unit 342. For example, the post-capture processor 310 may normalize hues or shades in images captured by the various sensors 308, may perform de-noising operations on the images, and may discard images that are not viable for pose estimation (e.g., images that were captured by a covered sensor 308 whose field of view was blocked by an object in contact with or in very close proximity to the lens of the sensor 308). In some implementations, the post-capture processor 310 is further operable to merge images from different sensors 308 to create a composite image that shows a wider portion of the environment surrounding the mobile device than any of the images captured by the sensors 308 individually. For example, a rectangular-shaped mobile device, such as a smartphone, may have four low-resolution image sensors 308 located around the periphery of the device, in particular at the respective corners of the housing of the device. The optical axis of each sensor 308 may be oriented in a direction that enables capturing images of the respective three-dimensional quadrant or octant of the environment about the corresponding corner of the device where the sensor 308 is located. A controller in the secondary imaging system 306 may transmit a signal to each of the sensors 308 that triggers each of the sensors 308 to capture an image of the environment at substantially the same time (e.g., simultaneously, concurrently). The images captured by each sensor 308 may be provided to the post-capture processor 310, which in turn merges the images to create a composite "panoramic" image depicting a 360-degree view around the entire phone. Some of the sensors 308 may have partially overlapping fields of view, and the post-capture processor 310 can align the images based on common portions of the scene depicted in each image as a result of the overlapping fields of view.

In some implementations, the secondary imaging system 306 includes an image degradation engine 312 that degrades images from the low-resolution image sensors 308. The image degradation engine 312 may process images received directly from the low-resolution image sensors 308 or from the post-capture processor 310. The degradation engine 312 can apply various degradation techniques, including blurring, down-sampling (thereby decreasing the resolution of the images), bit-depth reduction (e.g., from high color to 8-bit color), conversion from color to grayscale or monochrome, or a combination of these and/or other techniques. Generally, the degradation engine 312 serves to degrade images for the purpose of obfuscating objects and other features shown in the image, thereby interfering with an ability to discern aspects of the image that could be used to recognize individuals or specific characteristics of an environment beyond what is required for pose estimation. The degradation engine 312 may degrade images by an amount that ensures compliance with a specified privacy policy. In some implementations, the degradation engine 312 may be bypassed if the images captured by the low-resolution image sensors 308 themselves are of sufficiently degraded quality that they comply with a specified privacy policy in the first instance.

In some implementations, the secondary imaging system 306 further includes an image abstraction engine 314. The image abstraction engine 314 is configured to process an input image to generate an abstracted representation of the input image. The input image can be provided to the image abstraction engine 314 from the low-resolution image sensors 308, the post-capture processor 310, or the image degradation engine 312. The abstracted representation of an image describes features (e.g., objects) shown in the images without revealing or showing the features themselves. In some examples, the abstracted representation of an input image is an image that includes abstracted representations of identified features shown in the input image. For instance, an input image that depicts a window, a door, and a tree may be converted to an abstracted image that shows respective geometric shapes corresponding to these objects, such as a first rectangle (corresponding to the window), a second rectangle (corresponding to the door), and a triangle or line (corresponding to the tree). By converting the underlying features shown in the image to abstracted representations, sufficient information is preserved to permit pose estimation without revealing the underlying features themselves. As such, the abstracted representation may comply with enhanced privacy or security requirements of the system.

In some implementations, the abstracted representations of the features in an input image are selected from a pre-defined library 316 of abstracted features. For example, the input image may be processed by a deep neural network or other model that identifies features in the image and maps them to abstracted representations from the library 316. In other implementations, the abstraction engine 314 algorithmically determines values for one or more parameters of the features shown in the image and uses these values to map features to corresponding abstracted representations. The parameters of each feature can include dimensions, size, shape, and location within the image, among others. In some implementations, the abstracted representation can be a non-pictorial description of the image, including descriptions of features in the image. For example, rather than explicitly generating an abstracted image, the abstracted representation can define instructions for generating such an abstracted image, or may simply include data identifying a set of features and values for their corresponding parameters.

Figure 4:
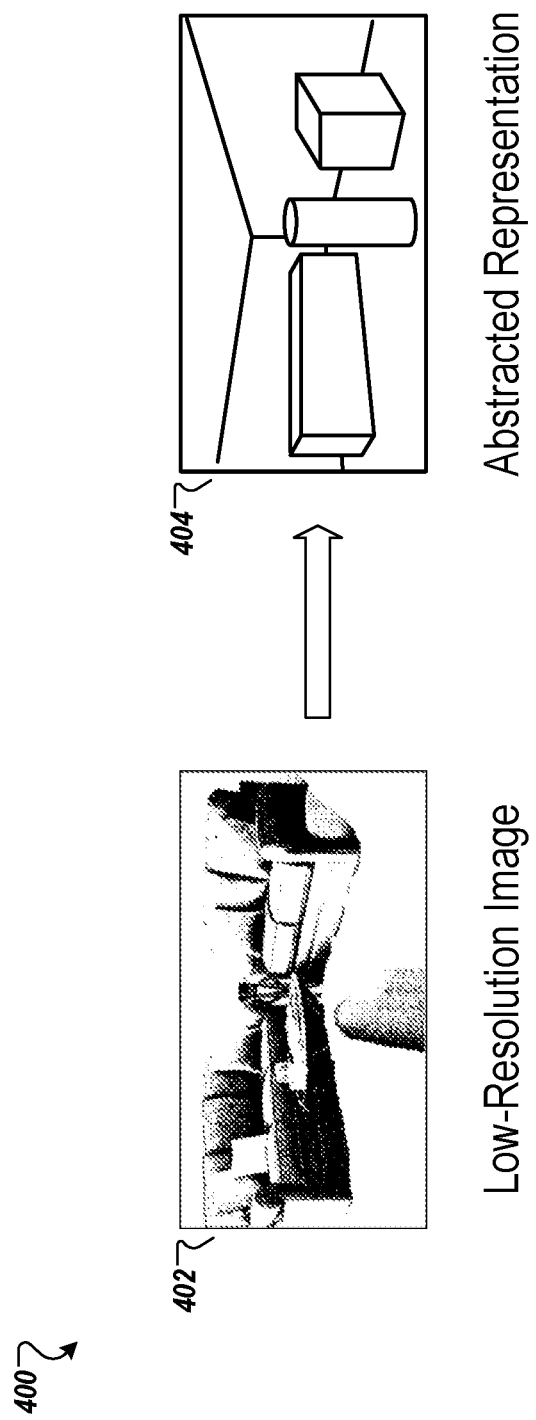
FIG. 4 is an illustration of an example conversion of a low-resolution image to an abstracted representation of the image.

By way of example, FIG. 4 shows an example translation 400 of a low-resolution image 402 to an abstracted representation 404 of the image 402. The image 402 was captured with low-resolution image sensors 308 of the secondary imaging system 306, and depicts various furniture in an indoor setting, such as a living room. To prevent unauthorized actors from accessing the image 402 and learning details about the environment, the image abstraction engine 314 may convert the image 402 to an abstracted representation 404. As shown, the abstracted representation 404 contains a minimal amount of information about the environment. The sofas depicted in image 402, for example, have been converted to generic 3D shapes that loosely approximate the size and shape of the original objects, but which are located in the image at corresponding locations to the locations of the original objects. In this way, processes and devices of the system 300 outside of the secondary imaging system 306 may only have access to the abstracted representation 404 rather than the image 402 itself, thereby increasing the difficulty of unauthorized processes to discern details of the environment. The 3D shapes selected for inclusion in the abstracted representation 404 may be selected from the object library 316. In some implementations, the abstracted representation 404 may include 2D shapes (and further may be limited to 2D shapes). The complexity of shapes or other features in an abstracted representation 404 may be a function of an applicable privacy policy 322. For example, for increased privacy, the abstraction engine 314 may select only a subset of low-complexity models from the object library 316, whereas higher-complexity models may be permitted by a relaxed privacy policy 322 so as to increase precision in the ability to track objects and features in the environment. The higher-complexity models may more closely resemble the underlying objects or feature shown in the image 402.

In some implementations, the secondary imaging system 306 is implemented on dedicated hardware and includes security features that prevent unauthorized access to data stored in the system 306, such as the original image 402. Instead, the secondary imaging system 306 may expose only the abstracted representation 404 of the image 402 to external systems according to an applicable privacy policy 322.

The secondary imaging system 306 can further include a cache memory 318. The cache memory 318 stores images and/or abstracted representations of images captured by all or some of the low-resolution image sensors 308 for a period of time. In some implementations, the cache memory 318 operates on a first-in-first-out (FIFO) basis, such that more recent images or abstracted representations replace the oldest ones stored in the memory 318. By storing images and/or abstracted representations of the images for a period of time after they have been captured, objects or features shown in the images can be tracked over that time. As described in further detail below with respect to the pose estimation unit 342, changes in the presentation of objects and other features can allow for determination of a distance between the mobile device and the objects or other features, and thus for an estimation of the mobile device's pose and current location.

A privacy manager 320 is operable to configure the secondary imaging system 306 according to an applicable privacy policy 322. One or more privacy policies 322 may be stored by, or made accessible to, the privacy manager 320. Each privacy policy 322 defines a unique set of constraints governing the use and configuration of the secondary imaging system 306. For example, a privacy policy 322 may include data indicating the maximum resolution permitted for images captured by image sensors 308; whether to perform post-capture processing on raw images from the image sensors 308, and if so, parameters of the post-capture processing; whether to perform image degradation, and if so, parameters of the image degradation processes that should apply; whether to generate abstracted representations of captured images, and if so, parameters for generating the abstracted representations; whether a non-abstracted image, an abstracted representation of the image, or both can be made available to systems external to the secondary imaging system 306; which of the image sensors 308 are permitted to capture images (e.g., the sensors at all four corners, or only a subset of the sensors at particular corners of the mobile device); a frequency with which the low-resolution image sensors 308 are to capture images of the environment of the mobile device (e.g., multiple times per second, once per second, or less than once per second).

In some implementations, the privacy manager 320 automatically activates or de-activates the secondary imaging system 306 (and optionally pose estimation unit 342) according to rules defined by an applicable privacy policy 322. For example, a privacy policy 322 may identify times, dates, locations, and/or other contexts where the system is allowed or disallowed from capturing images and performing vision-enhanced pose and location estimation. The privacy manager 320 may identify a current context of the mobile device and determine whether that context corresponds to a context that has been whitelisted or blacklisted for the capturing of images with secondary imaging system 306 and the performance of vision-enhanced pose and location estimation. If the current context is allowed, the privacy manager 320 may activate the low-resolution image sensors 308 and automatically capture images in either a foreground or background process of the mobile device. If the current context is disallowed, the privacy manager 320 may disable the low-resolution image sensors 308 and block further capturing of images for vision-enhanced pose and location estimation until a permissible context is detected, the privacy policy changes, or a user manually overrides the policy 322. For example, the privacy manager 320 may block automatic image acquisition in a user's home, office, and other familiar locations or potentially sensitive locations. When the mobile device is located in public spaces and venues, such as malls, parks, restaurants, clubs, or stadiums, the privacy manager 320 may automatically activate image acquisition and vision-enhanced pose and location estimation processes according to an applicable privacy policy 322. Further, in some implementations, automatic image acquisition and vision-enhanced pose and location estimation processes may be disabled, or frequency reduced, when the remaining charge on a battery of the mobile device falls below a threshold level. In some implementations, the device may detect that it is located in a pocket or other closed space, and thus not in current use, and may deactivate automatic image acquisition and vision-enhanced pose and location estimation processes accordingly.

The system 300 can further include a set of auxiliary sensors and interfaces 324. In some implementations, the auxiliary sensors and interfaces 324 are all located on a mobile device, such as a smartphone or table computer. Generally, the auxiliary sensors and interfaces 324 provide additional information about the environment of the mobile device that can be used to estimate the pose and location of the mobile device, along with images or abstracted representations of images from the secondary imaging system 306. For example, a global positioning system (GPS) device 326 may determine geo-coordinates of the mobile device based on signals detected from GPS satellites. Using a cellular interface 338 and/or wireless local area network (WLAN) interface 340, the device may obtain an indication of its location using triangulation techniques based on its distance to respective cellular and/or WLAN access points. A light sensor 336 can measure and report an intensity of light (e.g., in the visible spectrum) in the environment of the mobile device.

Further, some mobile devices include an auxiliary inertial measurement unit (IMU) 328. The inertial measurement unit 328 includes sensors 330 and 334 to detect information about the orientation and motion of the mobile device in which the IMU 328 is installed. For example, the IMU 328 can include one or more gyroscopes 330 and one or more accelerometers 334 that continuously detect the specific force imparted on the device and the angular rate of motion of the device. One or more magnetometers 332 can also be provided to sense a magnetic field around the device. Measurements reported from the IMU 328 can be used to track the pose of the mobile device. However, error can gradually accumulate from IMU measurements, making estimations of the device's pose and/or location unreliable after a period of time (e.g., 20-30 seconds). For example, the device may identify its absolute location at time to. The device may then use measurements from IMU 328 to estimate that it has moved a certain distance from the initial location where it was located at time to. Based on the relative motion determined from measurements reported from IMU 328 and knowledge of the initial location, the device may estimate its location at a later time. However, as the device moves further from its initial location, error in IMU 328 measurements may accumulate making determination of the device's location unreliable based solely on measurements from the IMU 328. In some implementations, error in measurements from the IMU 328 can be rectified periodically based on visual data from the secondary imaging system 320.

To perform vision-enhanced pose and location estimation, the system 300 includes a pose estimation unit 342. The pose estimation unit 342 processes visual data from the secondary imaging system 320, and optionally additional data such as auxiliary data from the set of auxiliary sensors and interfaces 324 and mapping data from mapping data repository 324 to determine an estimated pose and location of the mobile device. The pose estimation unit 342 can include a visual data processor 344, an auxiliary data processor 346, and a SLAM engine 348 to generate an estimate of the devices current pose and location.

The visual data processor 344 is configured to process visual data from the secondary imaging system 320 to determine an estimate of the device's pose. Visual data can include low-resolution images from one or more of the low-resolution image sensors 308 (which may have been degraded by image degradation engine 312 and/or processed by post-capture processor 310), a composite image depicting the environment based on the union of the fields of view of multiple ones of the low-resolution image sensors 308, an abstracted representation of any of these images, or a combination of low-resolution images and their abstracted representations. In some implementations, the visual data processor 344 is configured to determine an estimate of the pose of the mobile device based on its distance from reference features (e.g., objects) in the environment that are shown in the visual data. The distance of the device to a feature shown in the visual data can be derived using any suitable technique. For example, if the same feature is shown in images captured by two or more image sensors 308 while the device's pose was unchanged, the visual data processor 344 would then be capable of determining a distance to the feature using stereopsis algorithms that quantify disparities in the locations of features shown in multi-view images due to a difference in spatial orientations of the image sensors 308. In some implementations, the visual data processor 344 can determine distances to features in the environment based on an amount of shift of the features in the visual data in images at different time steps when the images were taken while the device (and thus low-resolution image sensors 308) was oriented in different positions. Features located closer to the image sensors 308 would exhibit a greater shift in the visual data than features located farther from the image sensors 308. Based on these distances to features shown in the visual data, the visual data processor 344 can then use triangulation or other geometric techniques to determine its location in the environment. In some implementations, the visual data processor 344 obtains a sufficient number of measurements (e.g., distances to features in the environment) to determine an estimated pose of the mobile device for all six degrees of freedom (i.e., x, y, z, yaw, pitch, and roll).

The auxiliary data processor 346 is configured to process auxiliary data from the set of auxiliary sensors and interfaces 324 to estimate the pose and location of the mobile device. In some implementations, the auxiliary data includes measurements from the IMU 328 indicating the specific force, angular rate, and/or magnetic field surrounding the mobile device. With these measurements, the auxiliary data processor 346 may track the relative motion of the mobile device, and determine an estimate of the absolute pose of the device by evaluating its cumulative motion with respect to a reference pose from the start of the motion.

In some implementations, the pose estimation unit 348 further includes a SLAM engine 348. The SLAM engine 348 is configured to perform simultaneous localization and mapping (SLAM) using visual data from the secondary imaging system 306, auxiliary data from the set of auxiliary sensors and interfaces 324, visual data from the primary imaging system 302, or a combination of these. Using SLAM, the pose estimation unit 342 may generate even more accurate estimations of its pose and location in the environment. In some implementations, the SLAM engine 348 can identify an absolute geolocation or other anchor point in the environment, e.g., after a period of obstruction or deactivation due to privacy policies.

The pose estimation unit 342 can further store reference data 350 that identifies one or more reference poses or locations for the mobile device. The reference data 350 can anchor the device so that subsequent motion of the device is specified relative to a reference pose or location. For example, when the device is activated and initiates a pose and location estimation process, the pose estimation unit 342 may obtain an indication of the geolocation of the device from GPS module 326. Subsequently, the pose estimation unit 342 may determine an amount of movement of the mobile device using visual and auxiliary data, and may compute its absolute location by applying an offset to the reference location based on how much the device is determined to have moved from the reference location.

In some implementations, the pose estimation unit 342 stores multiple sets of pose parameters 352. A "best" estimate of the pose of the device may then be determined from one or more of the multiple sets of pose parameters 352. For example, the pose estimation unit 342 may determine a first set of pose parameters with the visual data processor 344 based on visual data from the secondary imaging system 306, and may determine a second set of pose parameters with the auxiliary data processor 346 based on auxiliary data from sensors and interfaces 324. The pose estimation unit 342 may then use heuristics to estimate a most accurate set of pose parameters. For example, the pose estimation unit 342 may evaluate the quality and quantity of the visual data and auxiliary data from which the several sets of pose parameters were determined, and assign a confidence to each set of data. A set of parameters with the highest confidence score may be selected as the optimal set, or the sets may be averaged and weighted according to their confidence scores.

The system 300 further includes one or more user interfaces 358. The user interfaces can include input user interfaces 360 and output user interfaces 362. Examples of input interfaces 360 include pointing devices, touch devices, speech-recognition devices, and keyboards and typing devices. Output user interfaces 362 can include devices for presenting and providing feedback to a user, such as displays for visual presentation of information, speakers for audible presentation, and motors for haptic feedback.

The estimated pose and location of a device can be used in various applications 356. In some implementations, the mobile device includes a maps and navigation application 358 that uses the pose estimate to present an indication of the device's current or tracked locations on a map of the environment, and to navigate to a target location within the environment. The navigation application 358 can obtain a map of the environment of the mobile device, which may be a map of an indoor facility such as a shopping mall or other private or public space, from a local or remote mapping data repository 354. In some implementations, the mobile device includes a compass application 360 that tracks a location of the sun in visual data from the secondary imaging system 306 to improve the ability of the mobile device to determine its direction and correct any errors in measurements from magnetometer 332. In some implementations, a fitness application 362 on the mobile device can leverage pose and location estimates to improve an ability of the device to track how a user has moved for fitness and wellness purposes. For example, the pose and location estimates may improve the ability to determine a distance traveled or a number of steps taken by the user over a period of time. Moreover, some implementations include a context engine 364 that uses pose and location estimates to determine a user's context (e.g., moving or stationary, riding in a car or walking). For example, the context engine 364 may classify a user's motion based on changes in pose and estimation data over time. The classification can then be used to inform a navigation process, such as by informing the navigation process of the user's current transportation modality (e.g., whether the user is traveling by bike, automobile, train, or is walking).

Figure 5:
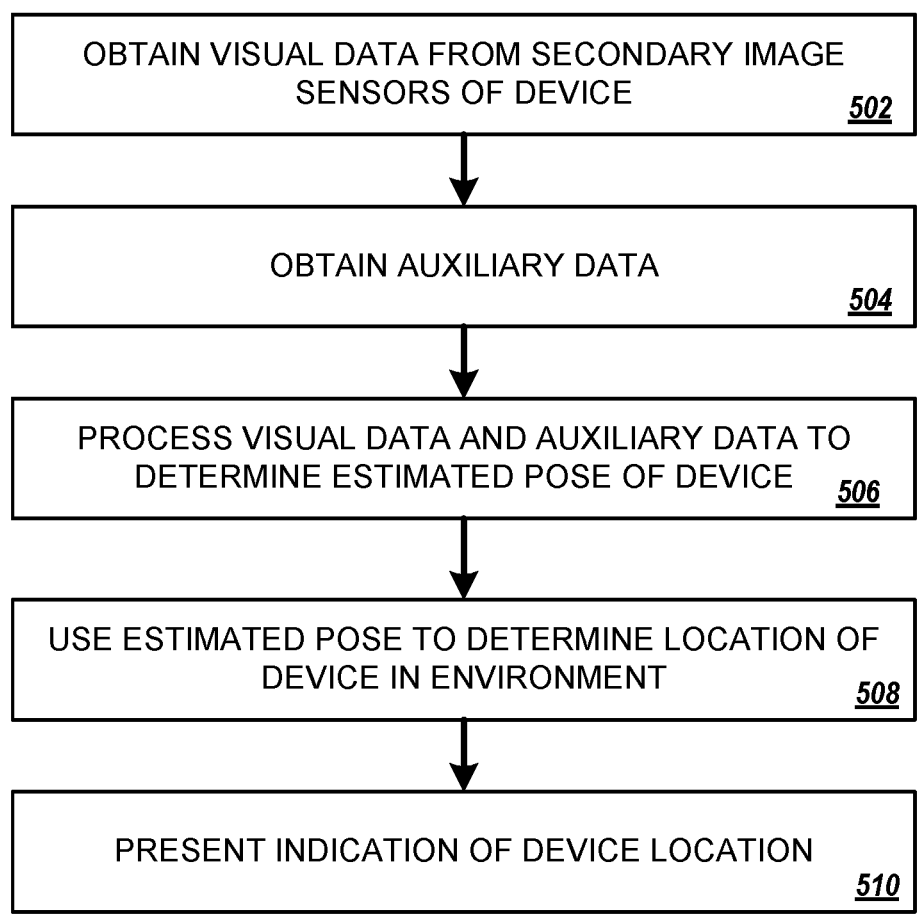
FIG. 5 is a flowchart of an example process for determining an estimated pose of a mobile device based on visual data.
Figure 6:
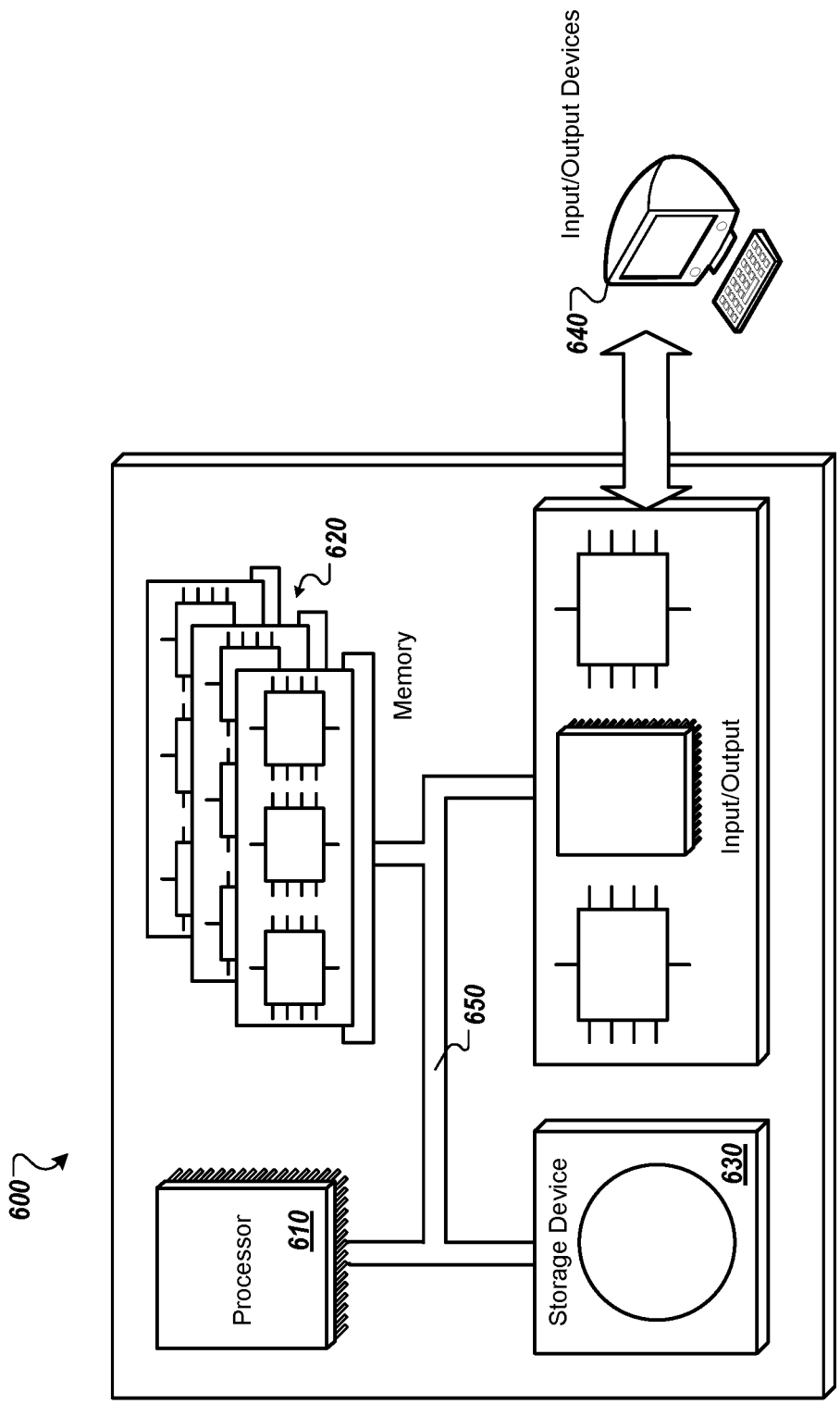
FIG. 6 depicts a block diagram of an example computing device that can be configured to carry out the various operations and processes described herein.

Referring now to FIG. 5, a flowchart is shown of an example process 500 for estimating the pose of a device using visual data. The process 500 can be performed, for example, by the system 300 (FIG. 3), mobile device 100 (FIG. 1), or computing system 600 (FIG. 6). Although the visual data is typically captured from image sensors on the device itself, other operations may be performed either locally on the device or on one or more other computers. By way of example, however, each of stages 502-510 below are described with respect to performance by the device itself to determine its own pose (e.g., a mobile device such as a smartphone, tablet computing device, or wrist-wearable device).

At stage 502, the device obtains visual data from image sensors of a low-resolution, privacy-enhanced imaging system. In some implementations, the imaging system is a secondary imaging system that is separate from a primary imaging system with which the device is configured to capture high-resolution photographs and video. The visual data can be based on images captured by a set of image sensors disposed around a periphery of the device. For example, in a device having a rectangular form factor such as a smartphone, tablet computer, or body of a wrist-worn device, an image sensor may be disposed at each corner of the device. Each image sensor has a wide field of view that covers the quadrant or octant of space surrounding the respective corner where the image sensors are mounted. Collectively, the fields of view of the image sensors at each corner of the device encompass substantially the entire, 360-degree sphere of space around the device. Although such extensive field of view may not be required at all times, providing coverage around the full device improves the likelihood that adequate images can be captured for pose estimation, regardless of the orientation of the device at a given time, how the user is holding the device, or whether one or some of the image sensors are fully or partially occluded. The visual data obtained at this stage may be, for example, individual images from each sensor, a composite image that is based on a merge of the individual images from multiple sensors, an abstracted representation of all or some of these images, or a combination of one or more images and one or more abstracted representations of images.

At stage 504, the device obtains auxiliary data to supplement the visual data for pose estimation. Although in some implementations the visual data is sufficient by itself to determine an estimated pose of the device, in other implementations, the pose is determined further using one or more forms of auxiliary data. For example, the device may obtain measurements from an IMU that are indicative of accelerations of the device, a magnetic field surrounding the device (e.g., the Earth's magnetic field), or other motion and orientation data. Other auxiliary information may include network data that indicates a location of the device, GPS data, and light sensor data. For example, if the light sensor indicates that the environment of the mobile device is too dark, then the device may cease visual-based pose and location estimation since the device may not be in use (e.g., is in a pocket, purse, or other container) or because it is too dark for the image sensors to acquire images of the environment.

At stage 506, the device processes the visual data, and optionally the auxiliary data, to estimate a pose of the device. The pose can be determined from the visual data, for example, by measuring distances between the device and certain features depicted or described in the visual data, such as objects that have a fixed location in the environment of the device. By determining distances from various features identified in the environment, the device can determine is position relative to those features and thus its position in the environment. Additionally, based on the appearance and relative locations of features in the visual data, the device may determine its orientation in the environment from the visual data. For example, a visual data processor of the device may identify a ground plane in the visual data and may determine the rotation of the device relative to the ground plane.

At stage 508, the device uses the estimated pose to determine its location in the environment. A "location" generally refers to a position of the device in real-world coordinates (e.g., latitude/longitude geolocation coordinates), or a position with respect to a real-world reference such as a map of the environment. To determine a location of the device from the pose, the device may access mapping data, for example, that provides a map of the device's current environment (e.g., a building or facility). A pose estimation unit in the device may correlate objects and other features from the visual data with objects or features of the environment represented in the mapping data, and then may use the determined distances from those objects or features to locate itself within the environment. In some implementations, the device may correlate a reference pose with a reference location in the environment (e.g., pose position (0,0,0) corresponds to a pre-defined location in a building). The estimated pose determined at stage 506 may then be expressed relative to the reference pose (e.g., pose position (12, 31, 10) indicates the device had advanced 12 meters in the x-direction, 31 meters in the y-direction, and 10 meters in the z-direction from the reference pose position). Based on the device's estimated offset from the reference pose position, the device may then determine its location in the environment by applying the offset to the corresponding reference location.

The estimated pose and location information can be used in a variety of applications. For example, in some implementations, a maps or navigation application may display a map of the device's environment (e.g., a floorplan of a building or facility where the device is located), and may present a graphical indication of the current location of the device (stage 510) within the environment. In some examples, the device may further track and display a path traveled by the device over a period of time on the map of the environment.

FIG. 6 is a schematic diagram of a computing device 600. The device 600 can be used to carry out the operations described in association with any of the computer-implemented methods described previously, according to an example implementation. The device 600 is intended to include various forms of digital computers, such as laptops, desktops, workstations, personal digital assistants, servers, blade servers, mainframes, and other appropriate computers. The device 600 can also include mobile devices, such as personal digital assistants, cellular telephones, smartphones, and other similar computing devices. Additionally the system can include portable storage media, such as, Universal Serial Bus (USB) flash drives. For example, the USB flash drives can store operating systems and other applications. The USB flash drives can include input/output components, such as a wireless transmitter or USB connector that can be inserted into a USB port of another computing device.

The device 600 includes a processor 610, a memory 620, a storage device 630, and an input/output device 640. Each of the components 610, 620, 630, and 640 are interconnected using a system bus 650. The processor 610 is capable of processing instructions for execution within the device 600. The processor can be designed using any of a number of architectures. For example, the processor 610 can be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the device 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can be a floppy disk device, a hard disk device, an optical disk device, a solid state device or a tape device.

The input/output device 640 provides input/output operations for the system 400. In one implementation, the input/output device 640 includes a keyboard and/or pointing device, including a touch screen. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method, comprising:
    obtaining visual data representing at least one image captured by one or more image sensors of a mobile device,
        wherein the at least one image shows an environment of the mobile device, and
        wherein the one or more image sensors are located along a peripheral edge of the mobile device, wherein the peripheral edge is separate from and positioned between a front surface of the mobile device and a rear surface of the mobile device, and
        wherein the mobile device comprises a primary imaging system and a secondary imaging system, wherein the one or more image sensors located along the peripheral edge of the mobile device form the secondary in imaging system and the secondary imaging system has a lower resolution than the primary imaging system; and
    processing the visual data to determine a pose of the mobile device.

2. The computer-implemented method of claim 1, wherein the mobile device is a smartphone or a tablet computing device, and the one or more image sensors are located at respective outermost corners along the peripheral edges of the smartphone or the tablet computing device.

3. A The computer-implemented method of claim 1,
    wherein an optical axis of each image sensor is oriented in a direction that is substantially normal to a second axis of the mobile device, wherein the second axis is normal to at least one of a major portion of a front surface of the mobile device or a major portion of a rear surface of the mobile device.

4. The computer-implemented method of claim 1, wherein the mobile device is a wrist-wearable computing device, and the one or more image sensors are located at respective corners of a body of the wrist-wearable computing device.

5. The computer-implemented method of claim 1, wherein the visual data represents images captured by at least two image sensors of the mobile device, each of the at least two image sensors located at a respective corner of the mobile device along the peripheral edge, and fields of view of the at least two image sensors collectively encompassing at least 75-percent of all views surrounding the mobile device.

6. The computer-implemented method of claim 1, wherein the visual data represents images captured by at least four image sensors of the mobile device, each of the at least four image sensors located at a respective corner of the mobile device along the peripheral edge, and fields of view of the at least four image sensors collectively encompassing at least 95-percent of all views surrounding the mobile device.

7. The computer-implemented method of claim 1, wherein a resolution of the one or more image sensors is less than a resolution of a primary camera of the mobile device.

8. The computer-implemented method of claim 7, wherein the resolution of the one or more image sensors is less than or equal to 1/n of the resolution of the primary camera of the mobile device, for n equal to 2, 3, 5, 10, 20, 35, 50, 75, 100, 150, or 200.

9. The computer-implemented method of claim 1, wherein processing the visual data to determine the pose of the mobile device comprises determining a translation of the mobile device in at least two of an x, y, or z axis.

10. The computer-implemented method of claim 9, wherein processing the visual data to determine the pose of the mobile device comprises determining a rotation of the mobile device about at least one of the x, y, or z axes.

11. The computer-implemented method of claim 1, comprising determining the pose of the mobile device further based on auxiliary sensor data that describes signals from at least one of an accelerometer, a magnetometer, or a gyroscope.

12. The computer-implemented method of claim 11, wherein determining the pose of the mobile device comprises:
    determining an estimated pose of the mobile device based on the auxiliary sensor data that describes the signals from the at least one of the accelerometer, the magnetometer, or the gyroscope; and adjusting the estimated pose of the mobile device based on the visual data that represents the at least one image captured by the one or more image sensors of the mobile device.

13. The computer-implemented method of claim 1, wherein the visual data represents images captured by the one or more image sensors of the mobile device over a series of time steps, and wherein processing the visual data to determine the pose of the mobile device comprises:
identifying one or more objects shown in the images;
determining changes in at least one of locations or geometries of the one or more objects shown in the images over the series of time steps;
determining respective distances between the mobile device and at least one of the one or more objects shown in the images based on the changes in the at least one of the locations or the geometries of the one or more objects shown in the images over the series of time steps; and
determining the pose of the mobile device based on the respective distances between the mobile device and the at least one of the one or more objects shown in the images.

14. The computer-implemented method of claim 1, wherein the visual data is an abstracted representation of the at least one image captured by the one or more image sensors of the mobile device, and the abstracted representation characterizes a set of objects shown in the at least one image.

15. The computer-implemented method of claim 14, further comprising generating the abstracted representation of the at least one image by mapping objects shown in the at least one image to objects in a pre-defined library of objects, such that the set of objects characterized by the abstracted representation consists of objects from the pre-defined library of objects.

16. The computer-implemented method of claim 14, wherein the abstracted representation of the at least one image further describes parameters for each object in the set of objects characterized by the abstracted representation.

17. A mobile device comprising:
one or more image sensors, each image sensor located along a peripheral edge of the mobile device, wherein the peripheral edge is separate from and positioned between a front surface of the mobile device and a rear surface of the mobile device,
wherein the mobile device comprises a primary imaging system and a secondary imaging system, wherein the one or more image sensors located along the peripheral edge of the mobile device from the secondary imaging system, and the secondary imaging system has a lower resolution than the primary imaging system;
one or more processors; and
one or more computer-readable media having instructions stored thereon that, when executed by the one or more processors, cause performance of operations comprising:
obtaining visual data representing images captured by the one or more image sensors that show an environment of the mobile device; and
processing the visual data to determine a pose of the mobile device.

18. The computer-implemented method of claim 1, further comprising:
determining a location of the mobile device in the environment based on the pose of the mobile device; and
presenting an indication of the location of the mobile device in the environment.

19. The computer-implemented method of claim 1, wherein the one or more image sensors are located at respective corners along the peripheral edge of the mobile device.

20. The computer-implemented method of claim 1, wherein the mobile device comprises a body having corners and lateral sides, wherein the peripheral edge extends around the corners and lateral sides of the mobile device.

21. The computer-implemented method of claim 1, wherein the primary imaging system comprises at least one of a camera on a front surface of the mobile device or a camera on the rear surface of the mobile device.

22. The computer-implemented method of claim 1, wherein the peripheral edge on which the one or more image sensors are located comprises a bezel of the mobile device, wherein the one or more image sensors comprise multiple image sensors having non-overlapping fields of view.

23. A non-transitory computer-readable medium storing software comprising instructions executable by one or more computers which, upon such execution, cause the one or more computers to perform operations comprising:
obtaining visual data representing at least one image captured by one or more image sensors of a mobile device,
wherein the at least one image shows an environment of the mobile device,
wherein the one or more image sensors are located along a peripheral edge of the mobile device, wherein the peripheral edge is separate from and positioned between a front surface of the mobile device and a rear surface of the mobile device, and
wherein the mobile device comprises a primary imaging system and a secondary imaging system, wherein the one or more image sensors located along the peripheral edge of the mobile device form the secondary imaging system, and the secondary imaging system has a lower resolution than the primary imaging system; and
processing the visual data to determine a pose of the mobile device.

* * * * *